United States Patent
Saguiguit et al.

(10) Patent No.: US 7,934,261 B1
(45) Date of Patent: Apr. 26, 2011

(54) ON-DEMAND CLEANUP SYSTEM

(75) Inventors: Francis Mari Estepa Saguiguit, Quezon (PH); Lennard L. Galang, Pasig (PH); Arman Castro Catacutan, Cavite (PH); Michael Stephen Abdon Tonido, Tacloban (PH); Bryant S. Tan, Manila (PH)

(73) Assignee: Trend Micro, Inc., Tokyo (JP)

( * ) Notice: Subject to any disclaimer, the term of this patent is extended or adjusted under 35 U.S.C. 154(b) by 916 days.

(21) Appl. No.: 11/762,251

(22) Filed: Jun. 13, 2007

(51) Int. Cl.
*G06F 12/14* (2006.01)
(52) U.S. Cl. ......................................... 726/24
(58) Field of Classification Search .................. None
See application file for complete search history.

(56) References Cited

U.S. PATENT DOCUMENTS 7,325,251 B1 * 1/2008 Szor ............................. 726/22
2007/0240222 A1 * 10/2007 Tuvell et al. ................... 726/24

* cited by examiner

*Primary Examiner* — Brandon S Hoffman
(74) *Attorney, Agent, or Firm* — Beyer Law Group LLP (57) ABSTRACT

An on-demand cleanup application running locally removes malware and its effects from a computer system. A virus scan engine scans the computer system to identify any malicious files. A system information collector tool executes to create a log file containing detailed information about the computer system and the location of all files. Identified malicious files are matched against the log file to determine the extent of the infection by the malicious files. Computer code is generated using a blank cleanup template to automatically delete the malicious files and their effects in the computer system and placed into a final cleanup template. The cleanup template is executed by a cleanup engine in order to remove the malware and its effects from the computer. A CRC tool is used to positively identify files that are to be deleted.

27 Claims, 4 Drawing Sheets

ON-DEMAND CLEANUP SYSTEM

FIELD OF THE INVENTION

The present invention relates generally to computer antivirus software. More specifically, the present invention relates to removal of computer viruses and other malware from a computer system.

BACKGROUND OF THE INVENTION

Computer viruses and other malware are a continuing threat to computers. Although various techniques and products exist for preventing malware and for detecting its existence on a computer system, it is to be expected that a certain percentage of computer systems will be infected by malware and will need remedial action. Often termed "cleanup" or "disinfection," various products exist that will remove malware and its effects from a computer system. Unfortunately, though, current cleanup techniques have drawbacks.

One technique is to create cleanup rules based upon common or conventional malware behavior. These cleanup rules are embodied in special computer software arranged to remove the malware and its effects from a computer system. These cleanup rules are readily available; however, their effectiveness depends upon how closely the type of malware infection fits these particular cleanup rules. If the malware performs system modifications not anticipated by the cleanup rules, or if the malware behavior is not common, then these cleanup rules will be ineffective. For example, various cleanup rules are present in many of Trend Micro, Inc. products such as PC-cillin and OfficeScan.

A second technique uses cleanup software specifically created to clean up after a particular malware infection. Creation of the software requires an engineer to perform analysis of the malware on a test machine in a laboratory, to record the changes in the computer system, and to manually formulate cleanup steps to remove the malware and its effects from the computer. For example, the cleanup steps clean system registries and system files that the malware has modified. This technique provides a near-perfect cleanup but has a lag from the time of the initial infection to the time the cleanup software is released to a customer. Also, the engineer's task can be difficult and a user is also required to download and apply the new cleanup software to the infected computer system.

In fact, one of the most time-consuming tasks for a software engineer is to perform this analysis. One example in the prior art is the Damage Cleanup Engine/Damage Cleanup Template (DCE/DCT) and System Clean Package available from Trend Micro, Inc. of Cupertino, Calif. The engineer must set up the right environments for a given computing platform on a test machine, create snapshots for system monitoring tools, execute the malware files, test for changes in the system, clean the system, perform pattern modifications if necessary and then retest the pattern. Each test needs to be performed repeatedly across numerous computing platforms for the pattern to be effective on these different computing platforms. Once the pattern is released by the engineer, a user must download the cleanup software, extract files, restart his or her computer, set various parameters, etc., all of which is time consuming for the user.

In view of the above drawbacks of currently available prior art techniques for performing malware cleanup, improved techniques and products are desired.

SUMMARY OF THE INVENTION

To achieve the foregoing, and in accordance with the purpose of the present invention, a software cleanup application is disclosed that performs computer system cleanup automatically, quickly and locally on a user computer.

The present invention provides an on-demand cleanup application to remove malware and its effects from a computer system. The application obviates the need for a customer to request special cleanup software, templates or patterns from a remote location: cleanup is provided locally. The customer need not request assistance from customer support and network bandwidth is reduced as the cleanup application executes locally on the customer's computer. Cleanup is performed rapidly without requiring a customer to submit a case in point to a central location or to an antivirus service provider. Software tools running on a local user computer execute to produce the required information necessary for a cleanup pattern to be created locally right on the infected user's computer. Once the cleanup pattern is created, the user may then execute this pattern on his or her computer in order to remove malware and its effects from the computer.

From the software engineer's point of view, it is not necessary to perform the tedious process of analyzing each malware application on a variety of computing platforms and creating cleanup templates by hand.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Currently, cleanup software performs cleanup after a malware infection but leaves open the possibility of remnants of the malware infection in the system registry. Once the malware file has been deleted from the computer system, the computer might not be able to locate the malware file to which these registry entries refer, thus causing the computer system not to boot up or preventing executable files from executing.

Advantageously, it is recognized that use of reliable system information can eliminate all malware remnants and malware effects to effectively perform malware cleanup with no lasting adverse effects.

The present invention takes advantage of existing software tools, namely: a system information collector software tool, a virus scanning engine and a CRC tool. Once the virus scanning detects malware it creates a log file listing the location of the malicious file. The system information collector software tool performs computer system inspection to help determine all possible malware effects in a system. The tool includes an output log file listing all identified malware effects thus providing more precise clean up and elimination of unwanted registry remnants. The collector tool executes, inspects the computer system for possible infection by the malware, and creates a log file as well. Analysis of the two log files yields the location of the malicious file and extent of its infection of the computer system. The CRC tool is used to determine the malicious file's CRC value. Now a DCT pattern file can be created automatically not only to eliminate the malware itself, but also to eliminate remnants of the malware.

To avoid false positives or unwanted deletions, a collection of normal registry entries and normal files (each provided with an MD5 or CRC value to properly identify the normal file) will be included in the process of creating the DCT pattern. This compilation or list of normal registry entries and files helps determine what to and what not to delete.

The present invention incorporates software that analyzes each of the output log files, integrates these outputs, and creates an appropriate cleanup pattern, all done locally on a user computer.

Virus Scan Engine

A virus scan engine is used by the present invention to scan the user computer system to determine the location of any malicious files. As is known in the art, a scan engine scans a particular file and compares it to a known virus pattern (or virus signature) in order to determine if that particular file is malicious. Scan engines are capable of scanning entire directories or entire disks of computer systems. Any of a variety of virus scan engines may be used to scan the user computer. Scan engines implementing malware signature-based scanning (used by antivirus companies) are suitable, including Trend Micro's VSAPI. Further, intrusion detection systems and other network monitoring scanners are also suitable.

In one particular embodiment, the scan engine "VSAPI" (Virus Scan API) available from Trend Micro, Inc. is used. This scan engine is the core scanning engine used in many of the Trend Micro products. The output from this scan engine is a list of detected malicious files and their location on the computer (i.e., the pathname and filename).

System Information Collector Software Tool

A system information collector tool collects information about a particular computer system and outputs the results to a log file. In the prior art, it has been necessary for an engineer to inspect this log file manually and then make decisions about how to create a cleanup template based upon this log file. Advantageously, the present invention contemplates that the output of this log file is automatically integrated with the scan engine results, thus permitting automatic creation of an effective cleanup template.

One of skill in the art will appreciate that collection of system information from a particular computer (as outlined below) may be performed in many different manners. For example, one may manually inspect the system information of the computer, or use other software tools such as HijackThis, Process Explorer, Task Manager and the like.

In one particular embodiment, a system information collector tool version 3.2 available from Trend Micro, Inc. of Cupertino, Calif. is used. Of course, other tools able to collect the below information may also be used. The collector tool automates the collection of information that can help pinpoint possible infections of unknown malware in a computer system.

The collector tool logs detailed information (i.e., hardware and software features) from the following categories concerning the host computer on which it is executed: system information (operating system, memory, processor, drives), user information (users, groups, privileges), memory usage, drive information, shared folders (name, type, uses, path and remarks for each share), active or running processes (with file path, related library files), active process tree, operating system services (names, state, type associated name), programs that run automatically when the computer starts (registry vectors, shell spawning, start up folders, object information, DLLs, image file execution options, etc.), any operating system software patches, HOSTS file, scheduled tasks, browser history, LSP chain, network status, application uninstall information, file versions (including message digests and rootkit status), the boot record from all drives, antivirus products present and any log files, network connections status (IP addresses, ports, protocols, states, associated processes and corresponding programs), compressed files (collection of possible modified files), rootkit detection information, etc. One of skill in the art will understand the variety and depth of detailed information that may be collected in each category.

During execution, results are output to a log file that may be viewed by a user upon completion, or the log file may be processed automatically as described below.

CRC Tool

As is known in the art, the CRC value may be calculated for a computer file using an algorithm called the Cyclic Redundancy Check (CRC). In general, a CRC value is a 32-bit number based upon the contents of a file. If the file contents change, the CRC value changes as well. This technique allows one to distinguish between different versions of a file by comparing the CRC values. Although it is not impossible for two files to have the same CRC value, it is extremely unlikely and the odds are enormously high that it would not happen. Even if only a single bit in the file changes, the CRC value for the changed file would be completely different. A variety of CRC value calculating software tools are publicly available. In one particular embodiment of the invention, a modified CRC algorithm is used that calculates a CRC value for file using only the first 4 kB of the file and the last 4 kB of the file.

On-Demand Cleanup System Overview

Figure 1:
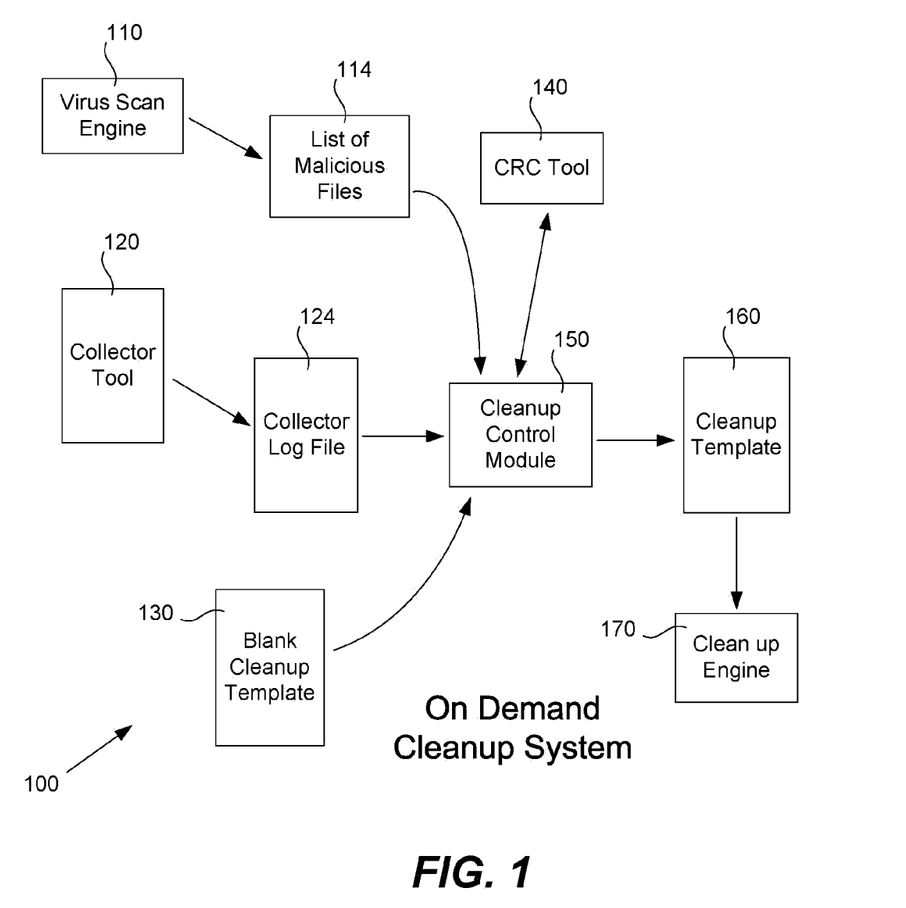
FIG. 1 is a block diagram of an on-demand cleanup system according to one embodiment of the invention.

FIG. 1 is a block diagram of an on-demand cleanup system 100 according to one embodiment of the invention. Virus scan engine 110 scans the entire disk of a user computer system and outputs a list of known malicious files 114. System information collector tool 120 analyzes the user computer system and outputs a collector log file 124 listing relevant software features. A blank cleanup template 130 includes computer code for cleaning up the user computer system, but is missing the actual path names, file names and other effects of the identified malicious files. CRC tool 140 is used to calculate a CRC value for a particular file. Cleanup control module 150 receives inputs from the above-identified sources and outputs a cleanup template 160 (or "on-demand cleanup pattern") containing computer code arranged to clean a user computer system of all identified malicious software. Module 150 also outputs a damage cleanup engine trigger to initiate execution of the engine 170 and a DONE signal indicating that the template 160 has been produced.

Cleanup engine 170 is a software tool that accepts as input cleanup template 160, the trigger signal, and executes the computer code in that template in order to remove the malicious software from the computer system. In one particular embodiment, cleanup engine 170 is the Damage Cleanup Engine (DCE) available from Trend Micro, Inc. Cleanup template 160 is written using predefined operators used by the DCE. Cleanup engine 170 is an executable program created using the C++ programming language that is designed to read and execute the cleanup template by reading a "tsc.ptn" file which is the encrypted and compiled cleanup template.

On-Demand Cleanup System Flowchart

Figure 2A:
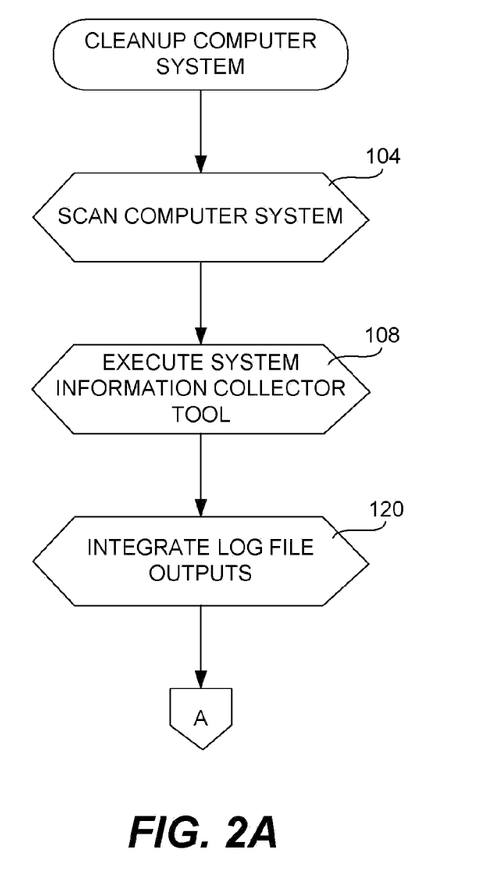
FIGS. 2A and 2B are a flow chart describing execution of the on-demand cleanup system according to one embodiment.
Figure 2B:
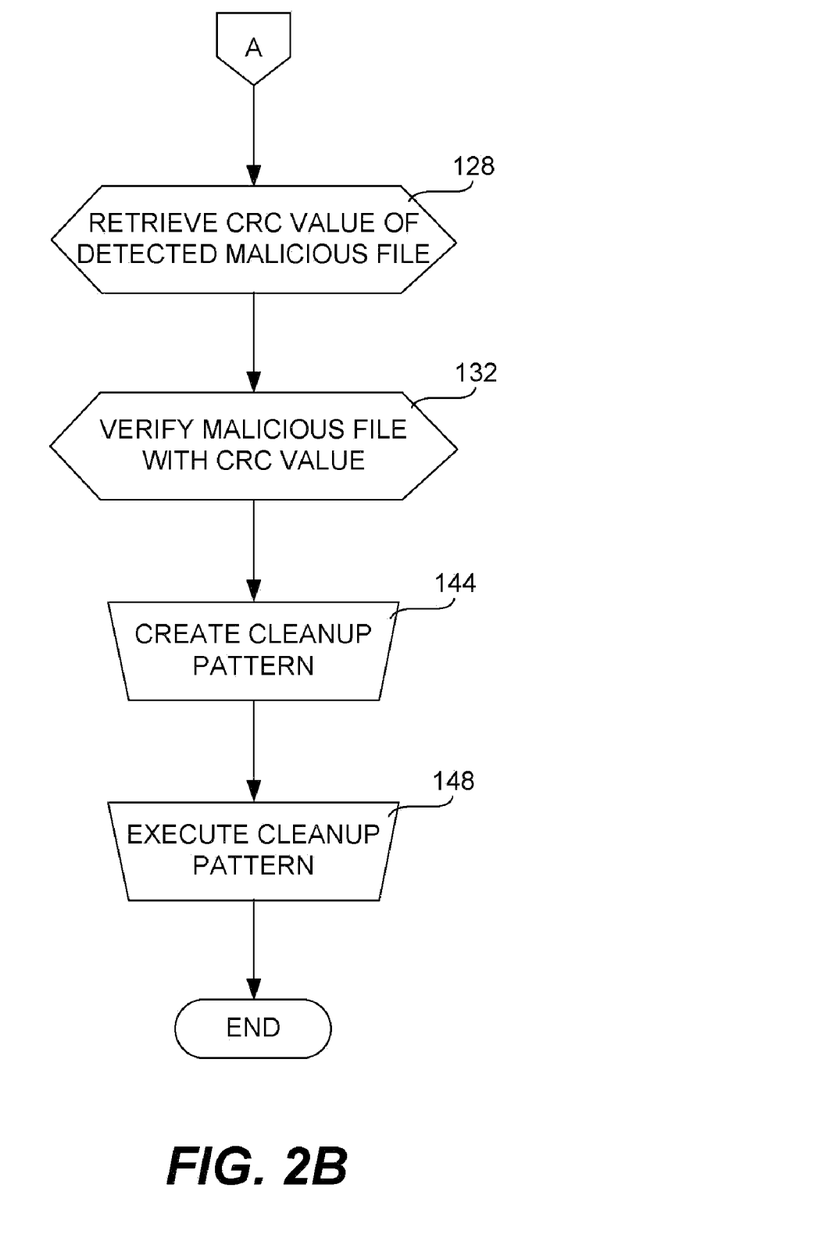

FIGS. 2A and 2B are a flow chart describing execution of the on-demand cleanup system 100 according to one embodiment. In step 104 a scan of the user computer system is initiated. Scanning may be initiated by the user, by a particular scanning software product, or may be scheduled to occur automatically, for example. Preferably, a scan is performed of the entire hard drive of the user computer and a log file is output listing the name of each malicious file found along with its pathname. Any number of files may be listed, ranging from zero to numerous. For example, scan engine 110 (such as VSAPI) outputs a list of malicious files 114. For each malicious file detected, control module 150 calculates the CRC value and stores that value in association with the particular malicious file path. Other values, however, may also be used to identify the malicious file. Other information such as properties of the file, an MD5 value and other relevant information may be used. This information is temporarily stored by control module variables and is used subsequently by the cleanup template.

In step 108 the system information collector tool 120 executes in order to analyze the entire computer system to determine the extent of the malware infection. Basically, collector tool 120 provides a "snapshot" of the state of the current hardware and software features of the computer system as described above and outputs this information into a log file. The log file preferably lists this information in a text file, although other formats may also be used.

In step 120 the output of scan engine 110 is integrated with log file 124 in order to determine the extent of the malware infection in the computer system. For each identified malicious file in list 114, cleanup control module 150 obtains the pathname and filename of that malicious file from the list of malicious files 114. Module 150 then searches through collector log file 124 for all entries that refer to that malicious file (i.e. for which a match exists). Module 150 matches an entry in log file 124 if the entry is referenced in the full file path of the detected file. For example, if the full file path of a detected malicious file is "c:\windows\system32\abc.exe," and the collector log file entries are as follows,

| HKEY LOCAL_MACHINE\Software\Microsoft\Windows\CurrentVersion\Run | |
|---|---|
| 1. abc --> [c:\windows\system32\abc.exe] | [MATCH] |
| 2. abc2 --> [abc.exe] | [MATCH] | then matches occur as indicated above. In the second situation there is also a match since without the full path, the file is still referenced in the system directory of the computer, which is equivalent to "c:\windows\system32."

The identified malicious file might be found in the autostart registry, in system services, in running processes, or in system configuration files. Examples of these situations are shown below.

Autostart Registry:
   HKEY_LOCAL_MACHINE\Software\Microsoft\Windows\CurrentVersion\Run
     1. MALWARE→[malware.exe]
Running Process:
   Process:PID
   Modules
   Malware.exe:2500
   [CACHE] C:\WINDOWS\system32\Malware.dll
SYSTEM Configuration File:
   SYSTEM.INI Configuration File
   [boot]
   shell=Explorer.exe Malware.exe

| Windows Services: | | |
|---|---|---|
| Service Name | Display Name | Command Line |
| Malware | Malware | C:\windows\system32\Malware.exe |

Once these entries are found, control module 150 flags and remembers these entries by storing them into its module. These locations are noted so that a cleanup template 160 may be created with computer code arranged to delete the malicious software from these locations. Control module 150 has reserved memory space to store this data. This data is accessed when the control module creates the cleanup template.

In step 128 control module 150 identifies the CRC value for the detected malicious file in list 114 that was calculated earlier. This CRC value is preferably generated using a hash algorithm also used by Trend Micro's Damage Cleanup Engine. In step 132 the original CRC value for this file is then compared with the CRC values for the actual files found at file locations identified in step 120 to make sure that the files to be deleted are actually the same malicious files identified in the virus scan. In other words, a CRC value is calculated for each suspected malicious file at the identified file locations and compared with the original CRC value from the virus scan. If more than one malicious file has been found, then these steps are performed for each malicious file.

Alternatively, any other algorithm suitable for calculating a unique identifying value for a particular file may be used instead of the CRC algorithm. For example, any suitable hash function or message digest may be used.

In step 144 control module 150 creates cleanup template 160 using blank cleanup template 130 and the identified locations of the malicious file from step 120. Blank template 130 is not strictly required as the computer code needed to delete the malicious file and its effects may be stored locally within control module 150. In one embodiment though, blank template 130 contains sample computer code for specific situations as described below. Basically, control module 150 retrieves the results of integration step 120 (i.e., all of the references to the malicious file and its effects found in the computer system) and creates instructions to delete the malicious file and its effects in various categories. For example, computer code is created to delete the actual malicious file wherever it is found, to delete any autostart registry entries referring to the malicious file, to delete any processes concerning the malicious file, and to delete any services concerning the malicious file.

Below is example computer code created and placed in cleanup template 160 arranged to delete the malicious file "mutant.exe". The variable "%myappdata%" contains the pathname of the malicious file. Control module 150 identifies all malicious files present in the user computer system and creates computer code as shown below in order to delete these files.

; This is a clean only entry
   ; File Type: VSDT_EXE_W32
   push("%myappdata%\Mutant.exe")
   call #SCAN_FILE jne(1) CLEAN04z
   file_del("%myappdata%\Mutant.exe")
:CLEAN04z Below is example computer code created and placed in cleanup template 160 arranged to delete any autostart registry entries associated with the malicious file "freecell.exe". Control module 150 identifies all malicious files present in the user computer system and creates computer code as shown below in order to delete these entries. The computer code deletes a registry entry completely, both registry key and value.

The registry path, file name and path, and CRC values are inserted into the computer code. Also, text lines are added used in operating system initialization/configuration files. These entries are determined by correlating the file path and name to the information found in collector log file 124.

```
r27 jne(1) CLEAN1d
    check_reg_data(HKLM,
"SOFTWARE\Microsoft\Windows
NT\CurrentVersion\Image File Execution
Options\freecell.exe", r28, 1)
    file_del(r28)
:CLEAN1d
```

Below is example computer code created and placed in cleanup template 160 arranged to delete any process associated with the malicious file "mutant.exe". The variable "%myappdata%" contains the pathname of the malicious file. Control module 150 identifies all malicious processes running in the user computer system and creates computer code as shown below in order to delete these processes.

```
; clean process %myappdata%\Mutant.exe
    r03 jne(1) CLEAN03
    H_process_by_filename("%myappdata%\Mutant.exe")
jne(1)
CLEAN03_VN
    H_close( )
    process_kill_by_filename("%myappdata%\Mutant.exe")
:CLEAN03_VN
    file_del("%myappdata%\Mutant.exe")
:CLEAN03
```

Below is example computer code created and placed in cleanup template 160 arranged to delete any operating system services associated with the malicious file. Control module 150 identifies all malicious files present in the user computer system and creates computer code as shown below in order to delete these operating system services.

```
    r01 jne(1) CLEAN01
    service_del("odbcasvc", " ")
:CLEAN01
```

Other categories of malicious software effects may also be deleted. For example, initialization and configuration files of the operating system such as "wininit.ini," "autoexec.bat" and "autorun.inf" may also be deleted using the cleanup template.

Below is the function "Scan File" used by the above computer code. Of course, these operations that delete the malicious file and its corresponding effects may be performed in other similar manners and written in other suitable types of computer code.

```
:#SCAN_FILE
    w61 pop
    push(0000d800) push(1000) push(f5d08d2b)
    push(00007000) push(1000) push(818a7b67)
    push(00001000) push(1000) push(887f67c2)
    push(3)
    H_file(r61)
    call #CHECK_FILE
    ret
```

Below are registry related functions used by the above computer code. These may also be written in any suitable computer language.

```
; ========== REG_ENUM_SCANFILE  Function ==========
:#REG_ENUM_SCANFILE
    jne(1) REG_ENUM_SCANFILE_RET pop
    w62 pop
    w65 pop
    H_reg_get_first_val(r62)
:REG_ENUM_SCANFILE_START
    jne(1) REG_ENUM_SCANFILE_VN pop w63 pop
    H_reg_get_val_data_str(r63) jne(1)
    REG_ENUM_SCANFILE_NEXT
pop
    w64 pop
    file_exist(r64) je(1) REG_ENUM_SCANFILE_FILE pop
    r65 r64 + w64
:REG_ENUM_SCANFILE_FILE
    pop r64
    call #SCAN_FILE je(1) REG_ENUM_SCANFILE_VY
:REG_ENUM_SCANFILE_NEXT
    pop H_use(r62)
    H_reg_get_next_val(r62)
    goto REG_ENUM_SCANFILE_START
:REG_ENUM_SCANFILE_VN
    H_close( ) pop
:REG_ENUM_SCANFILE_RET
    ret
:REG_ENUM_SCANFILE_VY
    pop
    H_close( ) pop
    r64 r63 push(1) ret
```

Once the cleanup template 160 has been created by the control module 150 it is stored in a suitable location in the computer system. In step 148 cleanup engine 170 reads the pattern in cleanup template 160, executes the computer code found within it and performs a cleanup on the user computer system by deleting all previously identified malicious files and their corresponding effects.

The present invention is applicable to all malicious software, or malware, that generally causes harm to a computer system, provides an effect that is not expected by the user, is undesirable, illegal, or otherwise causes the user to want to restore their computer system from a time prior to when it was infected by the malware. Malware can be classified based upon how is executed, how it spreads or what it does. The below descriptions are provided as guidelines for the types of malware currently existing; these classifications are not exact in that many groups overlap. For example, commercially available so-called "anti-virus" software is designed to scan a computer for viruses and worms, as well as for other malicious software. Of course, later developed software not currently known may also fall within the definition of malware. As used herein, the term malware is used to describe both the examples of malware and grayware described below.

When computer viruses first originated common targets were executable files and the boot sectors of floppy disks; later targets were documents that contain macro scripts, and more recently, many computer viruses have embedded themselves in e-mail as attachments. With executable files the virus arranges that when the host code is executed the virus code is executed as well. Normally, the host program continues to function after it is infected by the virus. Some viruses overwrite other programs with copies of themselves, thus destroying the program. Viruses often spread across computers when the software or document to which they are attached is transferred from one computer to another.

Computer worms are similar to viruses but are stand-alone software and thus do not require host files or other types of host code to spread themselves; they can move over the Internet using e-mail or socket connections. They do modify the host operating system, however, at least to the extent that they are started as part of the boot process. In order to execute, worms either exploit some vulnerability of the target host or use some kind of social engineering to trick users into executing them. Once executed, a computer worm might drop a backdoor program or a computer virus. Computer viruses and worms have common characteristics and that they both can propagate, they are covert and their effects can be devastating. Other differences are that a virus will attack the affected program while it is running, while a worm can attack other programs; viruses typically attack local files while worms typically attack remote network computers.

A Trojan horse program is a harmful piece of software that is often disguised as legitimate software. Trojan horses cannot replicate themselves, unlike viruses or worms. A Trojan horse can be deliberately attached to otherwise useful software by a programmer, or can be spread by tricking users into believing that it is useful. Some Trojan horses can spread or activate other malware, such as viruses (a dropper). A wabbit is a third, uncommon type of self-replicating malware. Unlike viruses, wabbits do not infect host programs or documents. And unlike worms, rabbits do not use network functionality to spread to other computers. A simple example of a wabbit is a fork bomb.

A backdoor is a piece of software that allows access to the computer system by bypassing the normal authentication procedures. There are two groups of backdoors depending upon how they work and spread. The first group work much like a Trojan horse, i.e., they are manually inserted into another piece of software, executed via their host software and spread by the host software being installed. The second group work more like a worm in that they get executed as part of the boot process and are usually spread by worms carrying them as their payload. The term ratware has arisen to describe backdoor malware that turns computers into zombies for sending spam.

An exploit is a piece of software that attacks a particular security vulnerability. Exploits are not necessarily malicious in intent—they are often devised by security researchers as a way of demonstrating that vulnerability exists. They are, however, a common component of malicious programs such as network worms. A root kit is software inserted onto a computer system after an attacker has gained control of the system. Root kits often include functions to hide the traces of the attack, as by deleting logged entries or by cloaking the attacker's processes. Root kits might include backdoors, allowing the attacker to easily regain access later or to exploit software to attack other systems. Because they often hook into the operating system at the kernel level to hide their presence, root kits can be very hard to detect.

Key logger software is software that copies a computer user's keystrokes to a file which it may send to a hacker at a later time. Often the key logger software will only awaken when a computer user connects to a secure web site such as a bank. It then logs the keystrokes, which may include account numbers, PINs and passwords, before they are encrypted by the secure web site. Software known as URL injection software modifies a browser's behavior with respect to some or all domains. It modifies the URL submitted to the server to profit from a given scheme by the content provider of the given domain. This activity is often transparent to the user.

A robot network or botnet is a large number of compromised computers that are used to create denial of service attacks or to send spam autonomously (also termed a zombie army). A target computer is often compromised via a Trojan horse that opens an IRC channel and waits for remote commands from the person in control of the botnet. The software of the botnet (botware) may be run as an independent process, but it tends to run inside other normal processes.

Other techniques used by malware include the following. A remote buffer overflow attack takes advantage of a security flaw in a computer and can be used by a worm, botnet, or by a hacker's remote control. Remote thread injection is a software development technique used to inject code into another process to run it as a thread. A hacker can use this same technology to propagate others processes without any file operations in order to disguise malware.

Another category of undesirable software is grayware. Grayware includes applications that cause annoying and possibly undesirable or unforeseen behavior in the way the programs run. Grayware is not necessarily detrimental to basic system operations, but it harbors the risk of opening computer vulnerabilities. Some applications classified as grayware are misused for malicious activity while others together and transmit information about a computer user's behavior. Grayware includes spyware, adware, dialers, hacking tools, joke programs and remote access tools.

Spyware is a piece of software that collects and sends information (such as browsing patterns or credit card numbers) about users and the results of their computer activity without explicit notification. Spyware usually works and spreads like Trojan horses. Adware is software that displays banner advertisements or pop-up advertisements when a computer is in use. Adware can have undesired effects on the system, such as interrupting an Internet connection or system operations, and is generally regarded as irritating and intrusive by users. A dialer is a program that replaces the telephone number in a modem's dial-up connection with a long-distance number (often out of the country) in order to run up telephone charges on pay-per-dial numbers, or dials out at night to send key logger or other information to a hacker.

Hacking tools render a computer or network more vulnerable to attack or use simulated hacking to test the vulnerability of accessible components. Hacking tools can be used to spy on an entire network and make it easy to exploit vulnerabilities. Although used to test the security of networks, they can be misused. Joke programs are relatively harmless although they can be annoying, such as by simulating a virus attack. Remote access tools enable remote access to an infected computer, thus permitting outside administration or manipulation. These tools are legitimate tools for managing external computers although they can be used to exploit vulnerabilities and can be misused. Mobile messaging malware (MMM) is malware propagated via a mobile messaging system including MMS, SMS or WAP push messages.

Computer System Embodiment

Figure 3A:
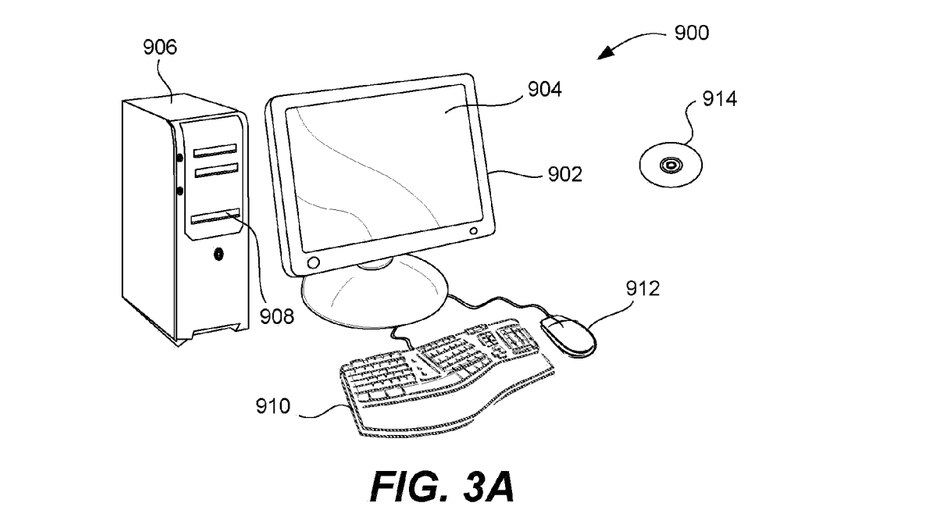
FIGS. 3A and 3B illustrate a computer system suitable for implementing embodiments of the present invention.
Figure 3B:
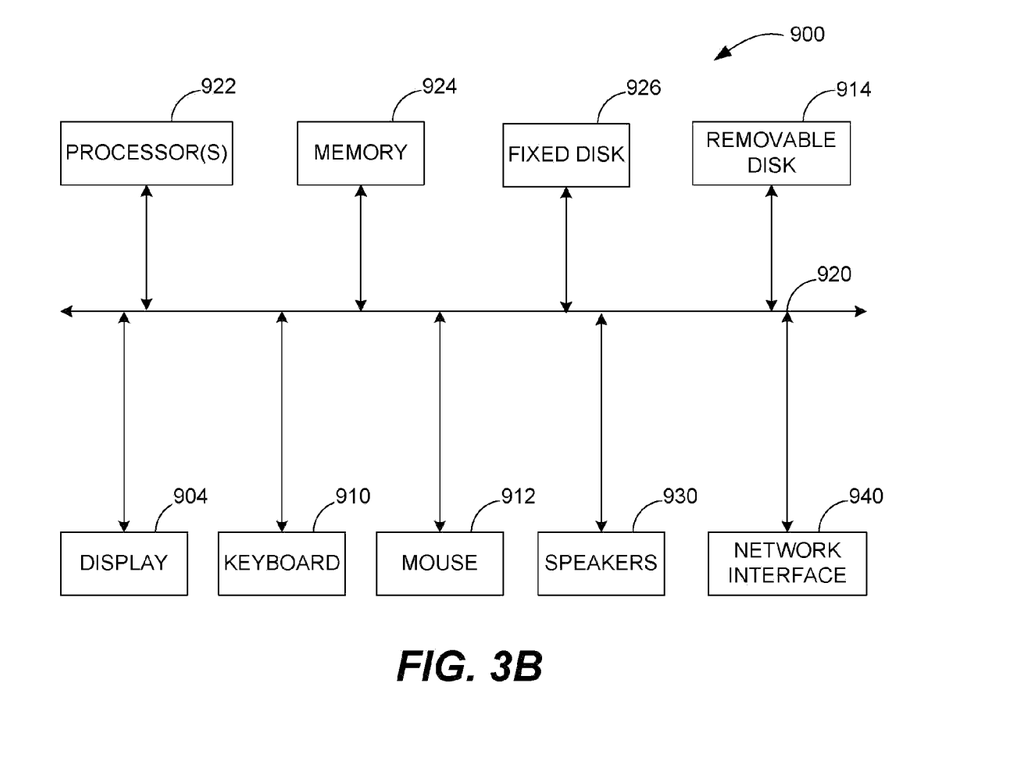

FIGS. 3A and 3B illustrate a computer system 900 suitable for implementing embodiments of the present invention. FIG. 3A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 3B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of cleaning up a computer system after a malware infection, said method comprising:
   scanning at least a portion of a computer system to identify at least one malicious software file having a file name;
   executing a system information collection tool to identify features of said computer system including information from a computer system registry;
   logging results of said executing into a collection log file as a plurality of entries;
   automatically analyzing said collection log file to determine entries of said log file that include said malicious software file name; and
   creating a cleanup file including computer code arranged to delete malicious software associated with said entries that include said malicious software file name.

2. A method as recited in claim 1 further comprising:
   scanning the entire hard disk of said computer system to identify said at least one malicious software file.

3. A method as recited in claim 1 wherein said steps of scanning, executing, logging, analyzing and creating all are performed locally on said computer system.

4. A method as recited in claim 1 wherein said entries include locations of said malicious software file, processes associated with said malicious software file, registry entries identifying said malicious software file, or operating system services associated with said malicious software file.

5. A method as recited in claim 1 further comprising:
   calculating a first unique identifying value for said identified malicious software file;
   calculating a second unique identifying value for a computer file identified by one of said entries in said log file that matches said identified malicious software file; and
   comparing said first unique identifying value to said second unique identifying value, whereby it is determined whether said computer file is the same as said identified malicious software file.

6. A method as recited in claim 5 wherein said first and second unique identifying values are CRC values.

7. A method as recited in claim 1 further comprising:
   executing said cleanup file in order that said entries matching said malicious software file are removed from said computer system.

8. A method as recited in claim 1 further comprising:
   accessing a blank cleanup template of computer code arranged to delete software; and
   combining said cleanup template with said determined entries to create said cleanup file.

9. A method as recited in claim 1 wherein said identified features of said computer system further include information from operating system services.

10. A method of cleaning a computer system, said method comprising:
    scanning a hard drive of a computer system to identify at least one malicious software file having a file name;
    executing a system information collection tool to identify features of said computer system and logging said features into a collection log file including information from a list of running processes;
    automatically determining an entry of said collection log file that matches with said file name of said malicious software file;
    creating computer code arranged to delete malicious software associated with said entry that matches with said file name of said malicious software file; and
    executing said computer code in order that said entry matching said malicious software file is removed from said computer system.

11. A method as recited in claim 10 further comprising:
    scanning the entire computer system to identify said at least one malicious software file.

12. A method as recited in claim 10 wherein said steps of scanning, executing, determining, creating and executing are all performed locally on said computer system.

13. A method as recited in claim 10 wherein said entry is a location of said malicious software file, a process associated with said malicious software file, a registry entry identifying said malicious software file, or an operating system service associated with said malicious software file.

14. A method as recited in claim 10 further comprising:
calculating a first unique identifying value for said identified malicious software file;
calculating a second unique identifying value for a computer file identified by said entry in said log file that matches said identified malicious software file; and
comparing said first unique identifying value to said second unique identifying value, whereby it is determined whether said computer file is the same as said identified malicious software file.

15. A method as recited in claim 14 wherein said first and second unique identifying values are CRC values.

16. A method as recited in claim 10 further comprising:
automatically determining a plurality of entries of said collection log file that match with said malicious software file; and
creating a plurality of routines of computer code arranged to delete said entries that match with said malicious software file.

17. A method as recited in claim 8 further comprising:
accessing a blank cleanup template of code arranged to delete software; and
combining said cleanup template with said determined entries to create said computer code.

18. A method as recited in claim 10 wherein said identified features of said computer system further include information from a computer system registry.

19. A cleanup system for a computer, said system comprising:
a virus scan engine that scans at least a portion of a computer;
a list of malicious software files produced by said virus scan engine;
a system information collection software tool that identifies features of said computer including information from a system configuration file;
a collection log file output by said collection software tool that lists said identified features of said computer;
a cleanup control module arranged to analyze said list of malicious software files and said collection log file to determine entries of said log file that match with said malicious software file, and further arranged to create computer code operational to remove malicious software associated with said entries from said computer; and
a cleanup file including said created computer code.

20. A system as recited in claim 19 wherein said virus scan engine scans the entire hard disk of said computer system to identify said at least one malicious software file.

21. A system as recited in claim 19 wherein said virus scan engine, said list, said collection tool, said collection log file, said cleanup control module and said cleanup file are all present locally on said computer.

22. A system as recited in claim 19 wherein said entries are locations of said malicious software file, processes associated with said malicious software file, registry entries identifying said malicious software file, or operating system services associated with said malicious software file.

23. A system as recited in claim 19 further comprising:
a software tool arranged to calculate a first unique identifying value for said identified malicious software file and a second unique identifying value for a computer file identified by one of said entries in said log file, wherein said first and second values are compared by said cleanup control module to determine whether said computer file is the same as said identified malicious software file.

24. A system as recited in claim 23 wherein said software tool is a CRC tool and said first and second unique identifying values are CRC values.

25. A system as recited in claim 19 further comprising:
a cleanup engine arranged to execute said cleanup file in order that said entries matching said malicious software file are removed from said computer.

26. A cleanup system as recited in claim 19 further comprising:
a blank cleanup template of code arranged to delete software, wherein said cleanup control module being further arranged to create said computer code using said blank cleanup template.

27. A cleanup system as recited in claim 19 wherein said identified features of said computer system further include information from a computer system registry.

* * * * *

UNITED STATES PATENT AND TRADEMARK OFFICE
CERTIFICATE OF CORRECTION

| | | |
|---|---|---|
| PATENT NO. | : 7,934,261 B1 | Page 1 of 1 |
| APPLICATION NO. | : 11/762251 | |
| DATED | : April 26, 2011 | |
| INVENTOR(S) | : Saguiguit et al. | |

It is certified that error appears in the above-identified patent and that said Letters Patent is hereby corrected as shown below:

Column 13, line 28, in claim 17, "A method as recited in claim 8" should be changed to --A method as recited in claim 10--

Signed and Sealed this
Thirteenth Day of March, 2012

David J. Kappos
*Director of the United States Patent and Trademark Office*